(12) United States Patent
Payen et al.

(10) Patent No.: US 9,211,038 B2
(45) Date of Patent: Dec. 15, 2015

(54) COOKING APPLIANCE WITH ELECTRIC IMMERSION RESISTOR COMPRISING A COOKING VAPOR SUCTION DEVICE

(75) Inventors: Jean-Marc Payen, Quetigny (FR); Olivier Pellerin, Minot (FR); Frédéric Seurat, Bretigny (FR)

(73) Assignee: SEB S.A., Ecully (FR)

( * ) Notice: Subject to any disclaimer, the term of this patent is extended or adjusted under 35 U.S.C. 154(b) by 894 days.

(21) Appl. No.: 12/495,997

(22) Filed: Jul. 1, 2009

(65) Prior Publication Data

US 2010/0000419 A1    Jan. 7, 2010

(30) Foreign Application Priority Data

Jul. 2, 2008 (FR) ..................................... 08 03749

(51) Int. Cl.
| | | |
|---|---|---|
| *A47J 37/12* | (2006.01) | |
| *A47J 37/04* | (2006.01) | |
| *A47J 36/38* | (2006.01) | |
| *A47J 36/20* | (2006.01) | |

(52) U.S. Cl.
CPC .............. *A47J 37/1209* (2013.01); *A47J 36/38* (2013.01); *A47J 37/1271* (2013.01); *A47J 36/20* (2013.01); *A47J 37/043* (2013.01)

(58) Field of Classification Search
CPC .............. A47J 37/1223; A47J 37/1214; A47J 37/1219; A47J 37/0611; A47J 37/1295; A47J 37/043; A47J 37/1247; A47J 36/20; A47J 36/36; A47J 36/26; A47J 36/2494; A47J 31/02; A47J 27/04; A47J 27/60; A47J 27/004; A47J 27/024; A47J 36/24; A21B 5/08; D06F 1/06; F24C 7/06; F24C 15/08; F24C 15/322

USPC ........... 99/408, 403, 404, 405, 406, 407, 316, 99/331, 410, 411, 412, 413, 414, 415, 416, 99/417, 418, 341; 219/438, 403, 430, 439; 126/391.1, 376.1, 345, 392.1, 373.1, 126/375.1, 1 R, 21 A

See application file for complete search history.

(56) References Cited

U.S. PATENT DOCUMENTS

| | | | |
|---|---|---|---|
| 2,546,464 A | | 3/1951 | Martin |
| 2,862,095 A | | 11/1958 | Scofild |
| 3,941,043 A | * | 3/1976 | Cerola et al. .................... 99/339 |
| 4,467,782 A | | 8/1984 | Russell |
| 4,903,587 A | * | 2/1990 | Nagasaka et al. ............... 99/325 |
| 5,001,970 A | * | 3/1991 | Graver ............................ 99/339 |
| 5,029,519 A | * | 7/1991 | Boyen ............................. 99/341 |

(Continued)

FOREIGN PATENT DOCUMENTS

| | | | | |
|---|---|---|---|---|
| EP | 150516 A1 | 8/1985 | | |
| GB | 2146888 A | * 5/1985 | .............. | A47J 37/12 |
| WO | 93/10698 A1 | 6/1993 | | |

*Primary Examiner* — Dana Ross
*Assistant Examiner* — Hemant Mathew
(74) *Attorney, Agent, or Firm* — Browdy and Neimark, P.L.L.C.

(57) ABSTRACT

A cooking appliance, particularly an electric fryer, having a vat and a lid enclosing a cooking chamber, the lid having a viewing window. The cooking chamber has an air inlet and an air and cooking vapor outlet connected to a suction device. Air introduced through the air inlet is directed toward the air and cooking vapor outlet while passing under the viewing window. An electric heating resistor is disposed inside the vat and is connected to a control box separable from the vat. Said suction device is supported by said control box.

25 Claims, 8 Drawing Sheets

(56) References Cited

U.S. PATENT DOCUMENTS

| | | |
|---|---|---|
| 5,415,081 A | 5/1995 | Yoshida et al. |
| D360,104 S | 7/1995 | Wistrand |
| 5,433,139 A | 7/1995 | Kitagawa et al. |
| 5,513,557 A | 5/1996 | Chiang |
| 5,617,777 A * | 4/1997 | Davis et al. ............... 99/408 |
| 5,780,815 A * | 7/1998 | Mestnik et al. ............. 219/400 |
| 5,996,477 A | 12/1999 | Bois |
| 6,006,658 A | 12/1999 | Siu |
| 6,131,564 A * | 10/2000 | Song ............... 126/391.1 |
| 6,363,834 B1 * | 4/2002 | Song ............... 99/330 |
| 7,098,427 B2 * | 8/2006 | Ducarme et al. ............. 219/437 |
| 7,841,093 B1 * | 11/2010 | Brady et al. ............... 30/408 |
| 2003/0159597 A1 * | 8/2003 | Lin ............... 99/482 |

\* cited by examiner

COOKING APPLIANCE WITH ELECTRIC IMMERSION RESISTOR COMPRISING A COOKING VAPOR SUCTION DEVICE

BACKGROUND OF THE INVENTION

The present invention relates to the technical field of cooking appliances comprising a vat provided for containing a cooking bath and an electric resistor disposed inside the vat. The present invention relates particularly though not exclusively to electric fryers of the aforementioned type.

The present invention relates more particularly to devices for filtering the cooking vapors produced during frying.

The patent document WO 93/10698 discloses a cooking appliance comprising a vat and a lid, which together delimit a cooking chamber, the cooking chamber having an air inlet and an air and cooking vapor outlet connected to a suction and filtering device, an electric heating resistor being disposed inside the vat, this electric heating resistor originating from a control unit separable from the vat. The control unit is removably mounted on a main body that receives the vat. The suction and filtering device is disposed inside the main body and has a cooking vapor suction and filtering system disposed partly underneath the vat. Such a structure contributes to increasing the cross-section of the device. The main body has a large volume. Moreover, the efficiency of the suction is reduced because of the bends present in said cooking vapor suction and filtering system.

BRIEF SUMMARY OF THE INVENTION

The present invention improves the ergonomics of a cooking appliance having an electric immersion resistor and a device for filtering the cooking vapors issuing from a vat provided for receiving a cooking bath. As used herein the term "vat" identifies a part that, in a deep fryer, is also termed a bowl, or a tank.

The present invention also reduces the bulk of a cooking appliance having an electric immersion resistor and a device for filtering the cooking vapors issuing from a vat provided for receiving a cooking bath.

The present invention further improves the cooking vapor filtering efficiency in a cooking appliance with an electric immersion resistor and a vat provided for receiving a cooking bath.

For these purposes the present invention is embodied in a cooking appliance, particularly an electric fryer, comprising a vat and a lid defining, or enclosing, a cooking chamber, the lid having a viewing window, the cooking chamber having an air inlet and an air and cooking vapor outlet connected to a suction device and arranged such that air introduced through the air inlet is directed toward the air and cooking vapor outlet while passing under the viewing window, an electric heating resistor being disposed inside the vat, the electric heating resistor being connected to a control box separable from the vat due to the fact that the suction device is supported by the control box.

This arrangement makes it possible to simplify the structure of the cooking chamber and to improve the ergonomics of a cooking appliance with an electric immersion resistor and a device for sucking out the cooking vapors issuing from the vat provided for receiving a cooking bath.

According to one advantageous embodiment, the suction device is housed inside the control box. Alternatively, the suction device could, for example, be removably mounted relative to the control box.

Advantageously, the air and cooking vapor outlet is disposed above the level of an upper edge of the vat. This arrangement makes it possible to facilitate the extraction of cooking vapor-laden air and to obtain a compact device.

Advantageously, the suction device is associated with a filtering device. Also advantageously, the filtering device is at least partly disposed upstream from the suction device.

Advantageously, the filtering device is supported by the control box. This arrangement makes it possible to simplify disassembly of the appliance.

Also advantageously, the filtering device comprises a filter unit that is removably mounted relative to the suction device. This arrangement makes it possible to facilitate the maintenance of the appliance.

Advantageously, the suction device comprises a ventilation unit which is accessible when the filter unit is removed from the device. This arrangement also makes it possible to facilitate maintenance of the appliance.

Advantageously, the filter unit comprises a presence detecting means provided for actuating a switch that enables the appliance to operate when the filter unit is in place inside the appliance and prevents the appliance from operating when the filtering unit is not in place inside the appliance. This arrangement makes it possible to improve the safety of the appliance.

Also advantageously, the filter unit comprises a filter cartridge removably mounted in a cartridge holder. This arrangement enables a more economical structure of the filtering device.

Advantageously, the presence detecting means is disposed on the cartridge holder. This arrangement makes it possible to simplify the structure of the filter cartridge.

Also advantageously, the air and cooking vapor outlet is disposed on the cartridge holder. This arrangement makes it possible to simplify the structure of the filter cartridge.

Also advantageously, the suction device has a cooking vapor vent disposed on one side of the control box. This arrangement makes it possible to reduce the size of the control box and avoid the user's being disturbed by the cooking vapors emerging from the appliance while using the control box, for example to adjust the cooking temperature and/or cooking time.

Advantageously, the suction device has another cooking vapor vent disposed on an opposite side of the control box, the ventilation unit being disposed between the one side and the opposite side of the control box. This arrangement makes it possible to facilitate the evacuation of the cooking vapors while preserving a reduced size for the control box.

Also advantageously, the control box has a support element. Thus, the control box, when removed from the appliance, can rest on a support surface. This feature is not necessarily limited to a control box supporting a suction device and/or a filtering device.

Also advantageously, the control box has a storage area for an electrical cord. This arrangement makes it possible to improve the ergonomics of the appliance. This feature is not necessarily limited to a control box supporting a suction device and/or a filtering device.

Advantageously, the support element is disposed underneath the storage area for the electrical cord. This arrangement makes it possible to improve the compactness of the appliance. This feature is not necessarily limited to a control box supporting a suction device and/or a filtering device.

In an advantageous embodiment, the vat is disposed inside an outer housing. This arrangement makes it possible to lower the temperature of the lateral walls of the device.

Also advantageously, the vat is removably mounted relative to the outer housing. This arrangement makes it possible to facilitate the cleaning of the appliance.

Advantageously, the air inlet is disposed between the outer housing and the lid. This arrangement makes it possible to simplify the structure of the appliance.

Also advantageously, the air inlet and the air and cooking vapor outlet are disposed opposite each other with respect to the vat. This arrangement enables better scavenging of the surface of the vat, resulting in a better extraction of the cooking vapors.

Statements herein that one part is removable from another should be understood to mean that there are no fastening elements that must be removed or loosened before removal can take place.

BRIEF DESCRIPTION OF THE DRAWINGS

The invention will be better understood from the description of a nonlimiting exemplary embodiment, illustrated in the attached FIGS. 1 through 12, in which.

DETAILED DESCRIPTION OF THE INVENTION

Figure 1:
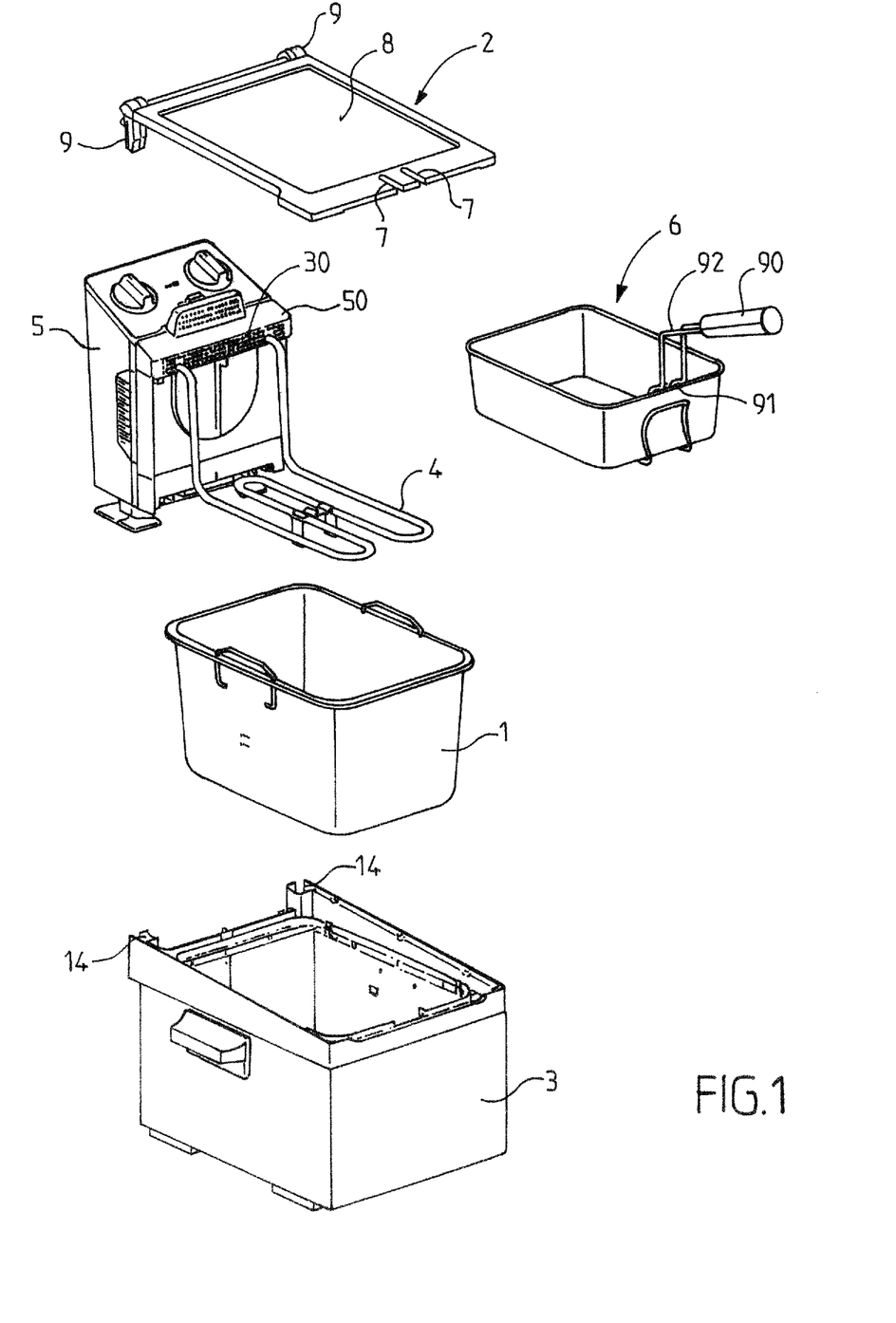
FIG. 1 is an exploded perspective view of an exemplary cooking appliance according to the invention.
Figure 2:
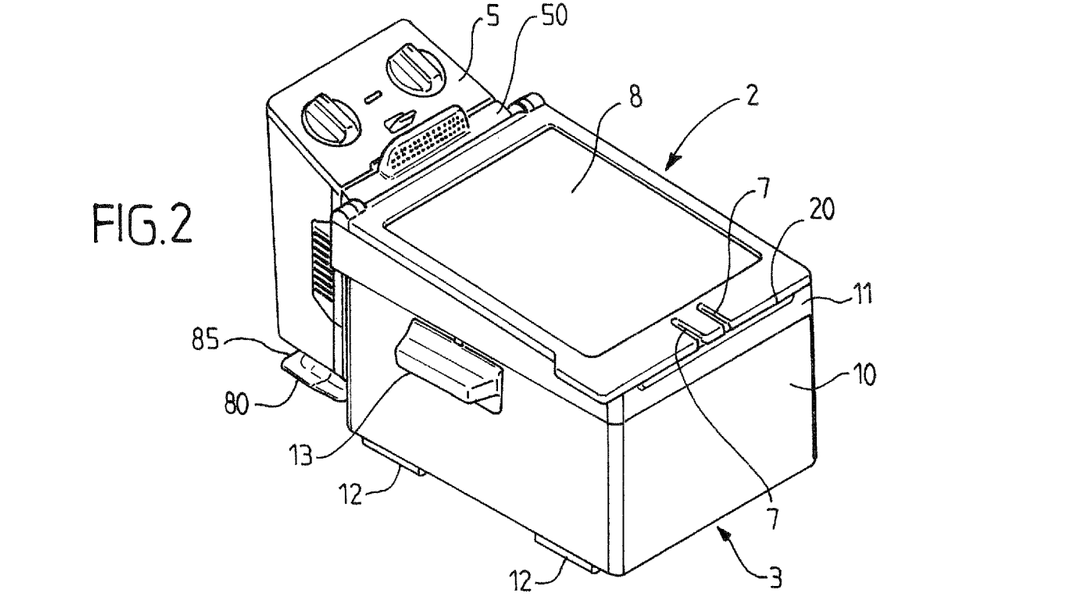
FIG. 2 is an assembled perspective view of the appliance illustrated in FIG. 1.

FIGS. 1 and 2 illustrate a cooking appliance, particularly an electric fryer, comprising a vat 1 and a lid 2 delimiting a cooking chamber. Vat 1 is disposed inside an outer housing 3 and is removably mounted relative to outer housing 3.

The appliance further comprises an electric heating resistor 4 connected to a control box 5 separate, and removable, from vat 1.

Vat 1 is provided for receiving a cooking bath. A basket 6 is provided so as to be placed inside vat 1 and receive food. Basket 6 can, for example, have lateral walls and/or a bottom made of openwork and/or wire mesh. Basket 6 has a handle 90.

Lid 2 has notches 7 provided for the passage of handle 90. Handle 90 has a lower support zone 91 provided for holding the basket in a raised position inside vat 1. Handle 90 has an upper support zone 92 provided for holding basket 6 in a lowered position inside vat 1.

Lid 2 includes a viewing window 8. The surface area of viewing window 8 is greater than or equal to 50% of the surface area of vat 1. Advantageously, viewing window 8 is made of glass.

Outer housing 3 has a bottom part 10, for example made of sheet metal, and a top part 11, advantageously made of plastic. Bottom part 10 is equipped with support elements 12. A handle 13 is disposed on each of the lateral surfaces of bottom part 10. Top part 11 is provided for supporting vat 1. Lid 2 comprises pivot pins 9 provided so as to be inserted into receptacles 14 of outer housing 3. Thus, lid 2 is pivotably mounted on outer housing 3. Lid 2 is removably mounted on outer housing 3.

Figure 3:
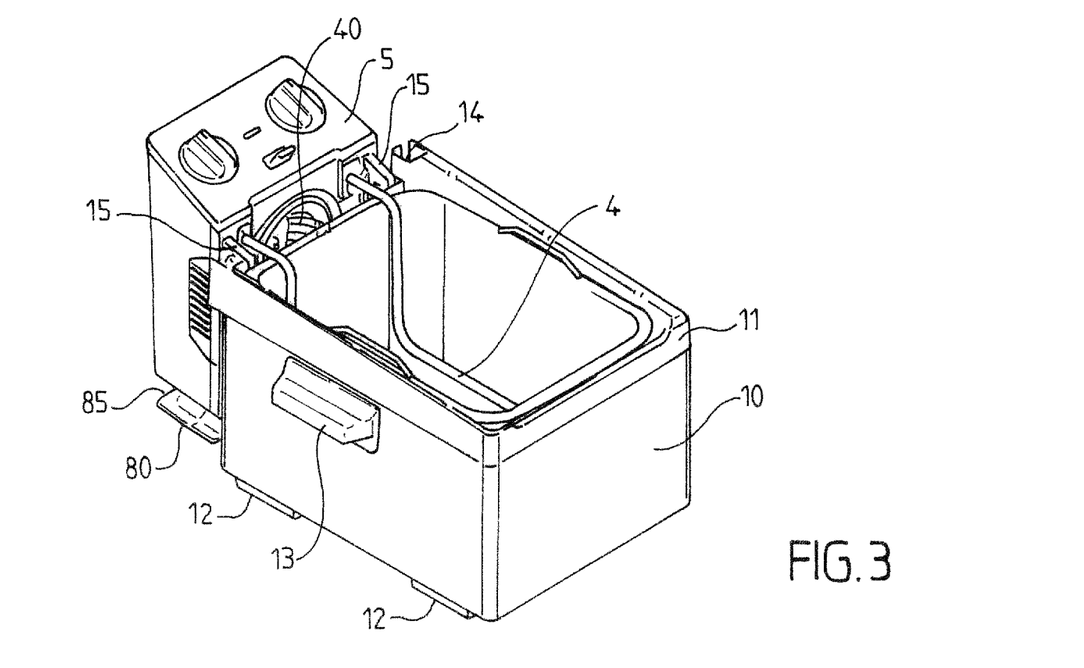
FIG. 3 is a perspective view of the appliance illustrated in FIG. 2, in which the lid and a filter unit have been removed.

As seen in FIG. 3, electric heating resistor 4 is disposed inside vat 1. Control box 5 is assembled with outer housing 3, for example by means of slide rails, not shown in the figures. Advantageously, outer housing 3 supports control box 5.

The heating chamber has an air inlet 20, more visible in FIG. 2, and an air and cooking vapor outlet 30, more visible in FIG. 1, connected to a suction device 40, more visible in FIG. 3. Air inlet 20 and air and cooking vapor outlet 30 are disposed at respective opposite edges of housing 3 so as to limit head, or pressure, losses. This arrangement facilitates attainment of a laminar air flow that enters through air inlet 20 when cooking vapor emissions are low. This arrangement enables better evacuation of air and cooking vapors when cooking vapor emissions are higher, for example when basket 6 containing the food to be fried is immersed into vat 1 containing a cooking bath. Lid 2 has a lower wall that inclines upward between air inlet 20 and air and cooking vapor outlet 30. As shown in FIG. 2, air inlet 20 is disposed between outer housing 3 and lid 2.

More particularly, suction device 40 is supported by control box 5. Thus, suction device 40 is removable relative to vat 1.

Suction device 40 is associated with a filtering device 50, illustrated in FIGS. 1 and 2. Filtering device 50 is advantageously at least partly disposed upstream from suction device 40. More particularly, filtering device 50 is supported by control box 5. Filtering device 50 comprises a filter unit 51 that is removable relative to suction device 40.

Figure 4:
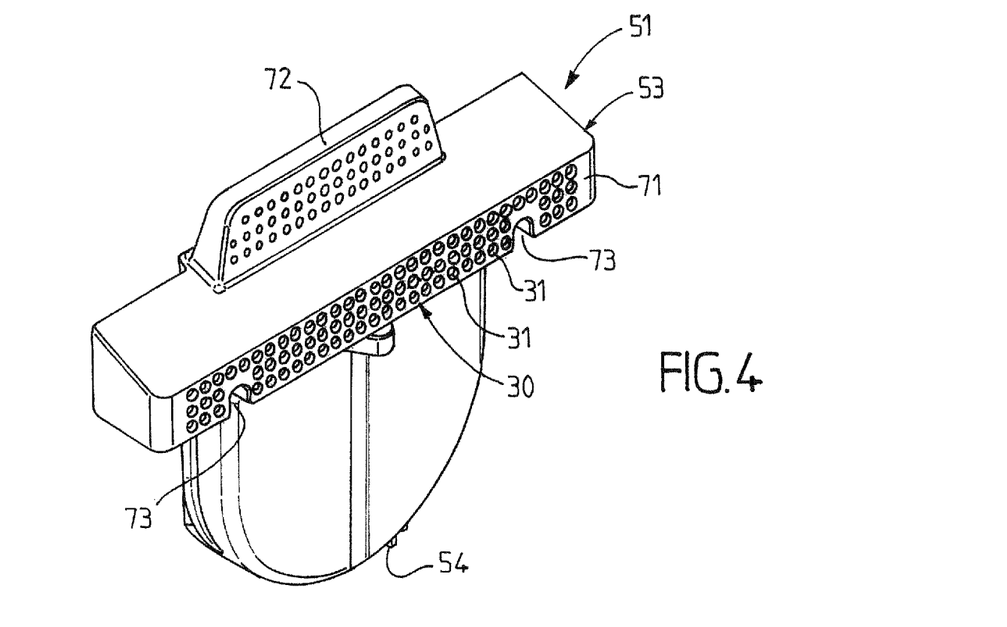
FIG. 4 is a front perspective view of an embodiment of the filter unit of the appliance illustrated in FIGS. 1 and 2.
Figure 5:
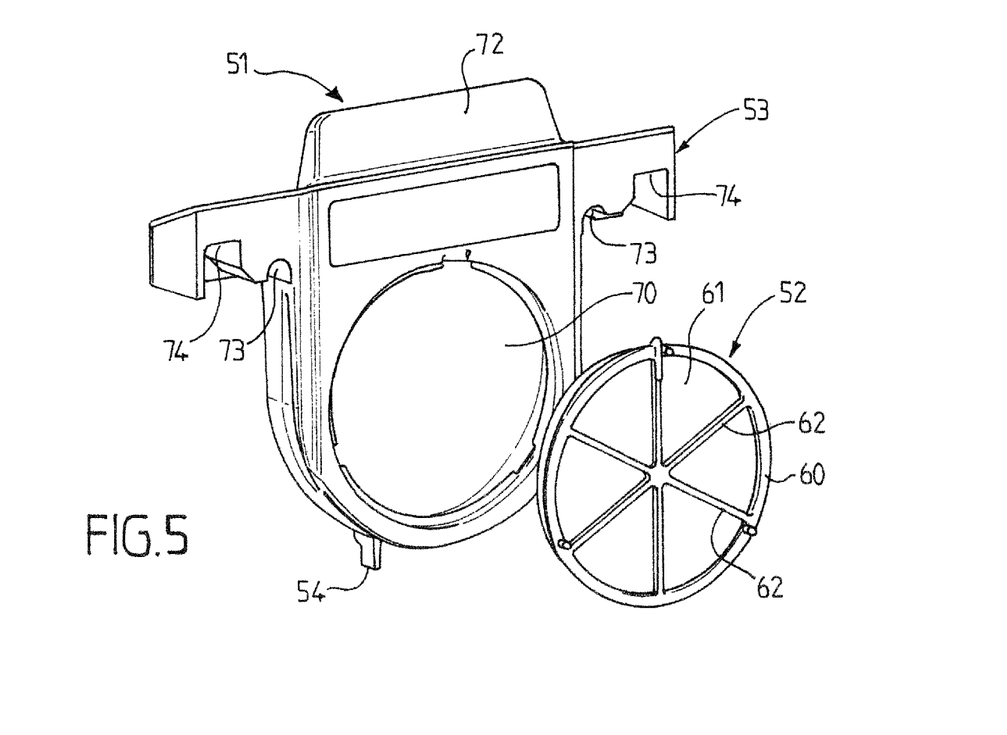
FIG. 5 is an exploded rear perspective view of the filter unit illustrated in FIG. 4.

As seen more clearly in FIGS. 4 and 5, filter unit 51 comprises a filter cartridge 52 removably mounted in a cartridge holder 53. Filter cartridge 52 comprises a frame 60 surrounding a filtering surface 61. Arms 62 originating at frame 60 divide filtering surface 61 into segments. Filtering surface 61 advantageously includes one or more active carbon filters. Filter cartridge 52 is mounted in an opening 70 of cartridge holder 53, for example by means of a bayonet coupling.

As clearly seen in FIGS. 1, 4, 6, 7 and 9, air and cooking vapor outlet 30 has a plurality of perforations 31 forming conduits extending away from viewing window 8. Thus, air sucked out by suction device 40 tends to scavenge the lower surface of viewing window 8.

Air and cooking vapor outlet 30 is disposed on cartridge holder 53 and is advantageously in the form of a plurality of perforations 31 formed in a front wall 71 of cartridge holder 53. Cartridge holder 53 forms a hollow body which conducts the air and the cooking vapors from air and cooking vapor outlet 30 to filter cartridge 52. Cartridge holder 53 has a grasping element 72, lower notches 73 provided for passage of electric heating resistor 4, and support zones 74 provided for resting on control box 5, more particularly on vertical members 15 visible in FIG. 3.

Figure 6:
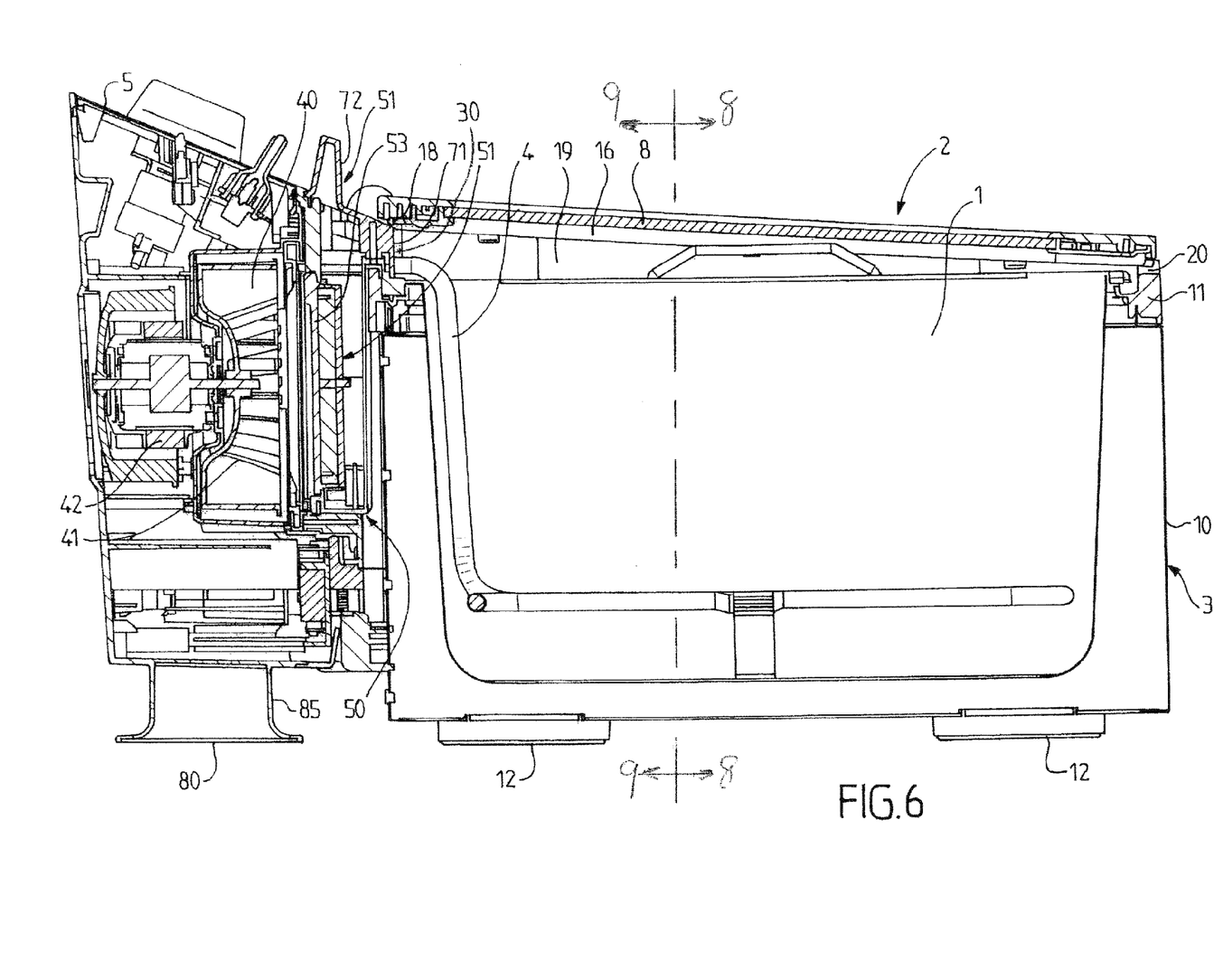
FIG. 6 is a longitudinal cross-sectional side view of the appliance illustrated in FIGS. 1 and 2.
Figure 7:
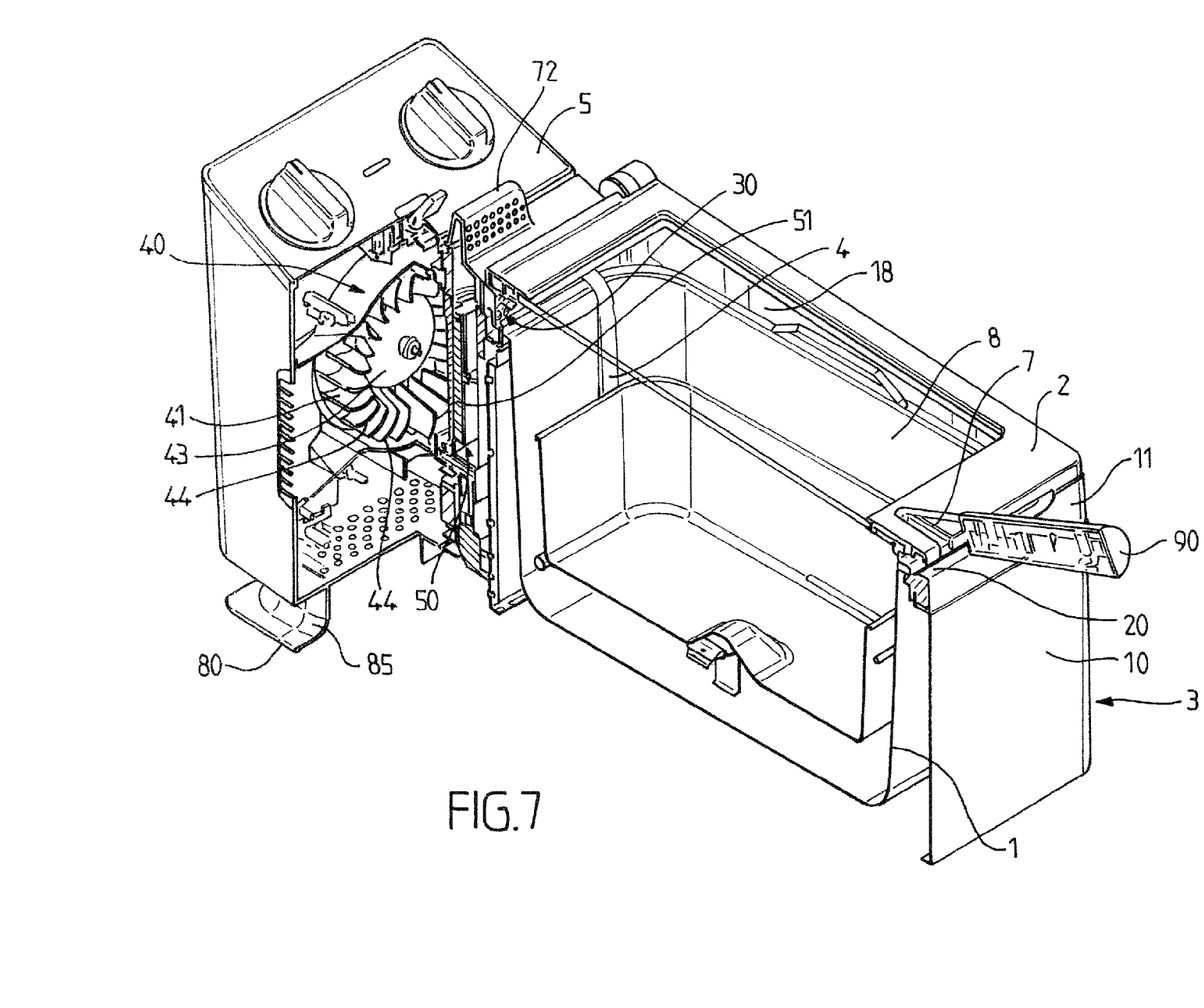
FIG. 7 is a partial cut-away longitudinal and cross-sectional perspective view of the appliance illustrated in FIGS. 1 and 2.

As seen more clearly in FIGS. 6 and 7, viewing window 8 is disposed at least partly above vat 1. The lower surface of viewing window 8 has a profile that rises between air inlet 20 and air and cooking vapor outlet 30. Suction device 40 is housed inside control box 5 and comprises a ventilation unit 41 driven by a motor 42. Ventilation unit 41 is disposed laterally relative to vat 1 and has a suction zone 43 disposed facing filtering surface 61 of filter unit 51. Suction zone 43 is surrounded by blades 44. Thus, ventilation unit 41 forms an exhaust turbine. As seen more clearly in FIG. 3, ventilation unit 41 is accessible when filter unit 51 is removed from the device. Air inlet 20 and air and cooking vapor outlet 30 are disposed opposite each other with respect to vat 1.

Vat 1 can be defined by a longitudinal dimension extending between air inlet 20 and air and cooking vapor outlet 30 and by a first transverse dimension alongside air inlet 20 and a second transverse dimension alongside air and cooking vapor outlet 30. Viewing window 8 can also be defined by a longitudinal dimension extending between air inlet 20 and air and cooking vapor outlet 30 and by a first transverse dimension alongside air inlet 20 and a second transverse dimension alongside air and cooking vapor outlet 30.

Figure 8:
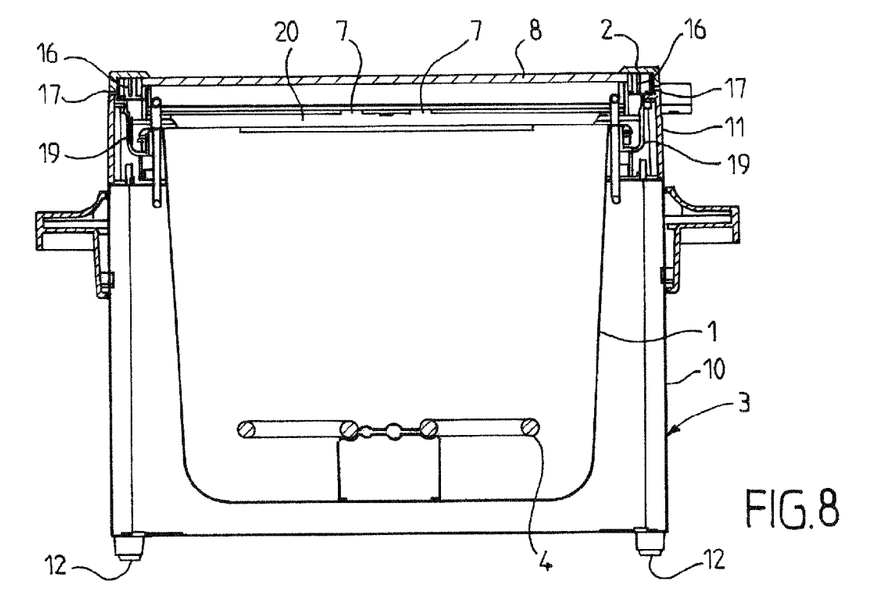
FIG. 8 is a cross-sectional view from the rear at the level of the vat of the appliance illustrated in FIGS. 1 and 2, taken along line 8-8 of FIG. 6.

Air inlet 20 extends transversely relative to vat 1 and relative to viewing window 8. As seen in FIG. 8, air inlet 20 extends over at least 80% of the width of viewing window 8 disposed above vat 1 and over at least 80% of the width of vat 1.

Figure 9:
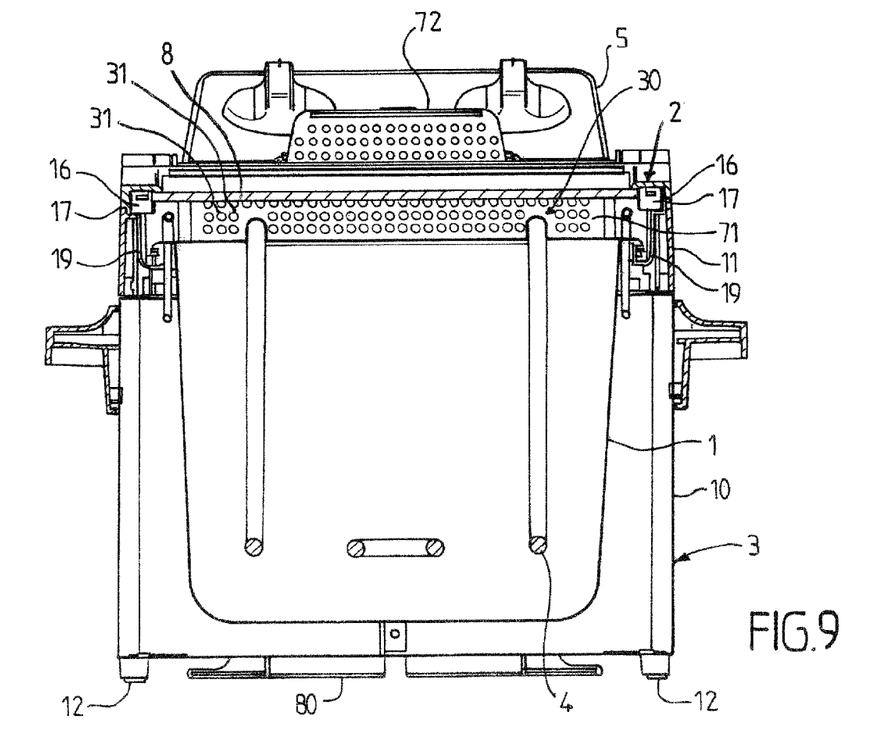
FIG. 9 is a cross-sectional view from the front at the level of the vat of the appliance illustrated in FIGS. 1 and 2, taken along line 9-9 of FIG. 6.

Air and cooking vapor outlet 30 extends transversely relative to vat 1 and relative to cooking window 8. As seen in FIG. 9, air and cooking vapor outlet 30 extends over at least 80% of the width of viewing window 8 and over at least 80% of the width of vat 1.

Figure 10:
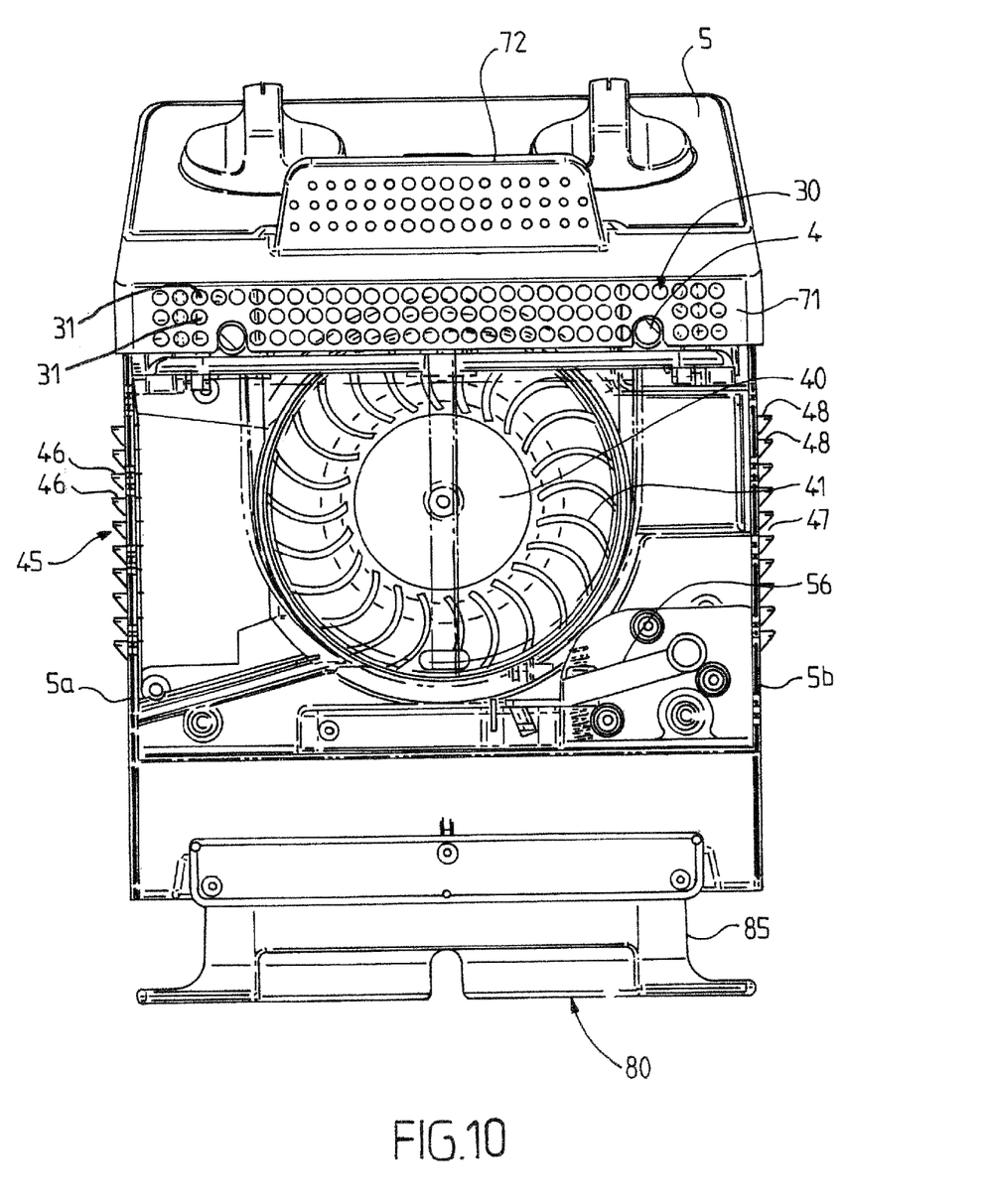
FIG. 10 is a front cross-sectional view at the level of the ventilation device of the appliance illustrated in FIGS. 1 and 2.

Air and cooking vapor outlet 30 is disposed on a lateral surface of filtering device 40 adjacent to vat 1, and in front of control box 5, as seen in particular in FIG. 10. Air and cooking vapor outlet 30 is disposed above the level of an upper edge of vat 1. Thus, front wall 71 of cartridge holder 53 is disposed above the level of an upper edge of vat 1.

As seen in FIGS. 6, 7, 8 and 9, lid 2 has a lower surface that contributes to channeling air and cooking vapors toward air and cooking vapor outlet 30, in cooperation with lower surfaces 19 (FIGS. 8 and 9) of top part 11 of outer housing 3. More particularly, viewing window 8 is mounted between two lateral elements 16 of lid 2, provided so as to be seated between upper edges 17 of outer housing 3 when lid 2 is closed, as seen in FIGS. 8 and 9. If desired, a gasket 18 can be mounted underneath lid 2 so as to rest on filter unit 51 when the lid is closed, as seen in FIG. 6. Alternatively, an additional air inlet disposed between lid 2 and filter unit 51 or control box 5 advantageously has a cross-section smaller than the cross-section of air inlet 20.

As seen in FIGS. 7, 8 and 9, the distance between air inlet 20 and air and cooking vapor outlet 30 is greater than the width of air inlet 20 and greater than the width of air and cooking vapor outlet 30.

As seen in FIG. 10, suction device 40 has a cooking vapor vent 45 disposed on one side 5a of control box 5. Cooking vapor vent 45 has upward-facing exhaust louvers 46. Suction device 40 has another cooking vapor vent 47 disposed on the opposite side 5b of control box 5, ventilation unit 41 being disposed between sides 5a and 5b of the control box. The other cooking vapor vent 47 also has upward-facing exhaust louvers 48.

Figure 11:
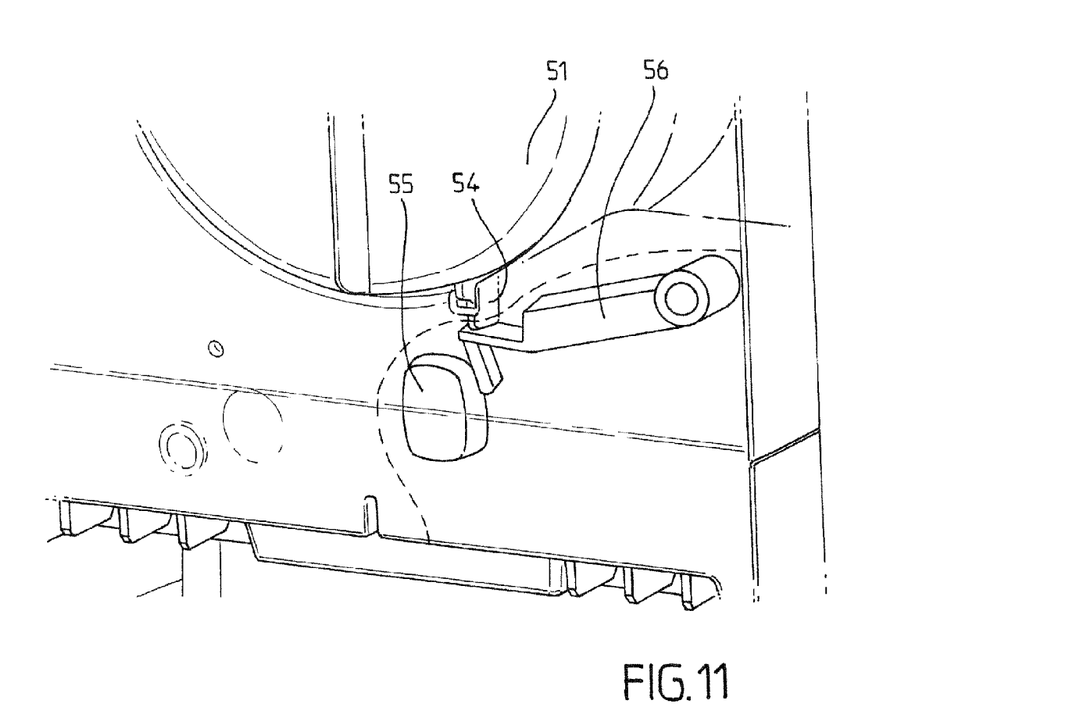
FIG. 11 is a perspective detail view of a portion of the appliance illustrated in FIGS. 1 and 2 showing a safety device associated with the filter unit.

As seen in FIGS. 5 and 11, filter unit 51 includes a presence detecting means 54 provided for actuating a switch 55 that enables the appliance to operate when filter unit 51 is in place inside the appliance and prevents the appliance from operating when filter unit 51 is not in place inside the appliance.

As seen more clearly in FIG. 5, presence detecting means 54 is disposed on cartridge holder 53. More particularly, as seen in FIGS. 10 and 11, presence detecting means 54 actuates switch 55 by means of a pivotably mounted lever 56.

Figure 12:
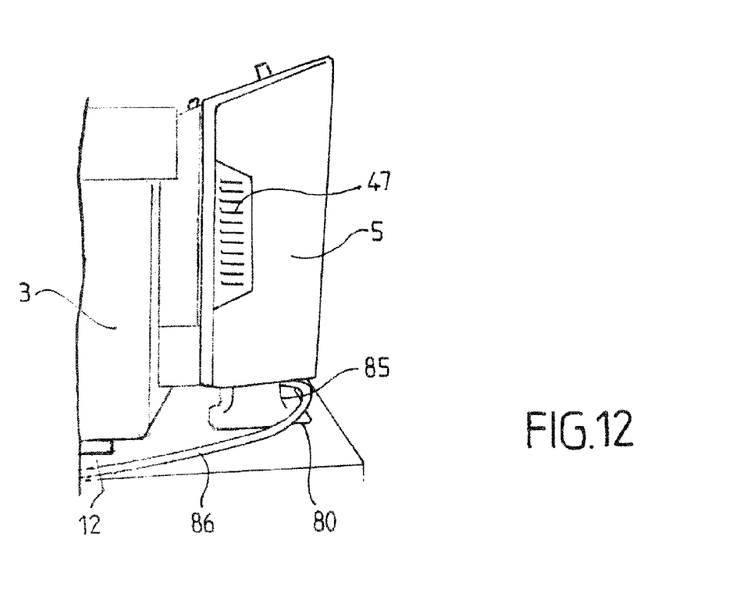
FIG. 12 is a side detail view of a portion of the appliance illustrated in FIGS. 1 and 2.

As seen in FIG. 10, control box 5 has a support element 80. As shown in FIG. 12, when control box 5 is mounted on outer housing 3 resting on a work surface, the bottom of support element 80 is at a higher elevation than the bottoms of support elements 12 and is spaced from said work surface.

As seen in FIG. 12, control box 5 has a storage area 85 about which an electrical cord 86 may be coiled for storage. More particularly, support element 80 is disposed underneath area 85 for storage of electrical cord 86. Support element 80 forms a foot.

A suction rate of 36 $m^3/h$ for suction device 40 provides satisfactory suction performance for cooking French fries in an oil bath from 1 kg of fresh potatoes. The estimated maximum instantaneous flow of cooking vapors escaping from the oil bath being on the order of 1.7 $m^3/h$, the dilution of the cooking vapors is approximately 1:20. A ratio of 30:1 between the suction rate of suction device 40 expressed in $m^3/h$ and the fresh potato capacity of the appliance expressed in kg is considered satisfactory; a ratio of 20:1 is considered acceptable.

An appliance according to the present invention will operate and be used in the following way.

The user places vat 1 into outer housing 3, electric heating resistor 4 into vat 1, and lid 2 onto outer housing 3. The user can program the cooking temperature and cooking time. The user then places foods such as fresh or precooked frozen potatoes into basket 6, preferably with the latter in a raised position above a cooking bath contained in vat 1. Switching on the appliance supplies power to electric heating resistor 4 and suction device 40. The user preferably closes lid 2 onto outer housing 3. Suction device 40 draws in ambient air through air inlet 20. The air introduced through air inlet 20 is directed toward air and cooking vapor outlet 30, passing under viewing window 8. More particularly, air introduced through air inlet 20 is channeled underneath viewing window 8 toward air and cooking vapor outlet 30 through the top part of the cooking chamber disposed above vat 1. The flow of air generated by suction device 40 performs a scavenging of the cooking vapors under viewing window 8 toward air and cooking vapor outlet 30. Preferably, the air introduced into the cooking chamber through air inlet 20 and sucked out through air and cooking vapor outlet 30 scavenges at least 80% of the width of the surface of viewing window 8 disposed above vat 1. This scavenging contributes to evacuating the cooking vapors toward air and cooking vapor outlet 30, lowering the temperature of viewing window 8, preventing the appearance of steam that would block a view of the contents of vat 1, and preventing the formation of condensates capable of dropping back into the cooking bath, particularly when the user has immersed basket 6 into the cooking bath in the lowered position inside vat 1. The air and cooking vapors sucked out by suction device 40 are then filtered by filtering device 50 and discharged from the appliance, after filtration, through cooking vapor vents 45 and 47.

The appliance according to the present invention offers the cooking performance of an appliance with an electric resistor immersed in the cooking bath, while allowing cooking with the lid closed, wherein the cooking vapors are evacuated to the outside of the appliance after their temperature has been lowered. The temperature of the lid is also lowered. The viewing window 8 of lid 2 enables easy monitoring of the cooking owing to the good visibility provided by suction device 40. The appliance can be easily disassembled; vat 1, basket 6, outer housing 3 and lid 2 have no electrical parts and can be easily cleaned. Removable filter unit 51 can be easily cleaned and/or replaced.

As a variant, filtering device 50 is not necessarily supported by control box 5, but could for example be supported by outer housing 3.

As a variant, suction device 40 is not necessarily associated with a rectangular vat 1.

As another variant, suction device 40 is not necessarily associated with a filtering device.

As a further variant, cooking vapor vent 45 and/or the other cooking vapor vent 47 are not necessarily disposed laterally on control box 5, but could for example be disposed on the back of control box 5, at the side opposite to, or facing away from, vat 1.

The present invention is not in any way limited to the exemplary embodiment described and its variants, but includes many modifications within the scope of the claims.

This application relates to subject matter disclosed in French Application number 08 03749, filed on Jul. 2, 2008, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A cooking appliance comprising:
   a vat and a lid that define and enclose a cooking chamber, said lid having a viewing window and said cooking chamber having an air inlet and an air and cooking vapor outlet;
   a suction device in fluid flow communication with said outlet;
   a control box housing said suction device;
   an electric heating resistor connected to and supported by, said control box and disposed inside said vat; and
   a filtering device with which said suction device is associated,
   wherein:
   air introduced through said inlet is directed toward said outlet while passing under said viewing window to scavenge cooking vapors under said window and prevent the appearance of steam that would block a view of the contents of said vat;
   said suction device is supported by said control box; and said viewing window is visible from outside the appliance when food is being cooked;
   said control box is constructed and mounted to be separable from said vat together with said suction device and said electric heating resistor;
   said filtering device comprises a filter unit that is removably mounted relative to said suction device; and
   said filter unit is located between said air and cooking vapor outlet and said suction device to filter air and cooking vapor leaving said cooking chamber, and said filter unit comprises a presence detecting means provided for actuating a switch that enables said appliance to operate when the filter unit is in place inside said appliance and events said appliance from operating when said filter unit is not in place inside said appliance.

2. The cooking appliance according to claim 1, wherein said suction device is housed inside said control box.

3. The cooking appliance according to claim 1, wherein said outlet is disposed above an upper edge of said vat.

4. The cooking appliance according to claim 1, wherein said filtering device is supported by said control box.

5. The cooking appliance according to claim 1, wherein said suction device comprises a ventilation unit that is accessible when said filter unit is removed from said suction device.

6. A cooking appliance comprising:
   a vat and a lid that define and enclose a cooking chamber, said lid having a viewing window and said cooking chamber having an air inlet and an air and cooking vapor outlet;
   a suction device in fluid flow communication with said outlet;
   a control box housing said suction device;
   an electric heating resistor connected to and supported by, said control box and disposed inside said vat; and
   a filtering device with which said suction device is associated,
   wherein:
   air introduced through said inlet is directed toward said outlet while passing under said viewing window to scavenge cooking vapors under said window and prevent the appearance of steam that would block a view of the contents of said vat;
   said suction device is supported by said control box; and said viewing window is visible from outside the appliance when food is being cooked;
   said control box is constructed and mounted to be separable from said vat together with said suction device and said electric heating resistor;
   said filtering device comprises a filter unit that is removably mounted relative to said suction device;
   said filter unit comprises a cartridge holder and a filter cartridge removably mounted in said cartridge holder; and
   said filter unit comprises a presence detecting means provided for actuating a switch that enables said appliance to operate when the filter unit is in place inside said appliance and prevents said appliance from operating when said filter unit is not in place inside said appliance, and said presence detecting means is disposed on said cartridge holder.

7. The cooking appliance according to claim 5, wherein said suction device has a first cooking vapor vent disposed on a first side of said control box.

8. The cooking appliance according to claim 7, wherein said suction device has a second cooking vapor vent disposed on a second side of said control box, opposite to said first side, and said ventilation unit is disposed between said first and second sides of said control box.

9. The cooking appliance according to claim 1, wherein said control box has a support element.

10. The cooking appliance according to claim 1, further comprising an outer housing, and wherein said vat is disposed within said outer housing.

11. The cooking appliance according to claim 10, wherein said vat is mounted to be removable from said outer housing.

12. The cooking appliance according to claim 1, wherein said cooking appliance is an electric fryer.

13. The cooking appliance according to claim 10, wherein said control box is located outside said outer housing.

14. The cooking appliance according to claim 6, wherein said suction device is housed inside said control box.

15. The cooking appliance according to claim 6, wherein said outlet is disposed above an upper edge of said vat.

16. The cooking appliance according to claim 6, wherein said filtering device is supported by said control box.

17. The cooking appliance according to claim 6, wherein said air and cooking vapor outlet is disposed on said cartridge holder.

18. The cooking appliance according to claim 6, wherein said suction device comprises a ventilation unit that is accessible when said filter unit is removed from said suction device.

19. The cooking appliance according to claim 18, wherein said suction device has a first cooking vapor vent disposed on a first side of said control box.

20. The cooking appliance according to claim 19, wherein said suction device has a second cooking vapor vent disposed on a second side of said control box, opposite to said first side, and said ventilation unit is disposed between said first and second sides of said control box.

21. The cooking appliance according to claim 6, wherein said control box has a support element.

22. The cooking appliance according to claim 6, further comprising an outer housing, and wherein said vat is disposed within said outer housing.

23. The cooking appliance according to claim 22, wherein said vat is mounted to be removable from said outer housing.

24. The cooking appliance according to claim 22, wherein said control box is located outside said outer housing.

25. The cooking appliance according to claim 6, wherein said cooking appliance is an electric fryer.

* * * * *